United States Patent
Kroon

(10) Patent No.: US 6,438,083 B1
(45) Date of Patent: Aug. 20, 2002

(54) APPARATUS FOR RECORDING A CONTINUOUS INFORMATION STREAM IN AVAILABLE GAPS BETWEEN PRE-RECORDED PORTIONS OF A RECORDING TRACK, RECORD CARRIER SO RECORDED, AND APPARATUS FOR READING SUCH RECORD CARRIER

(75) Inventor: Jacobus P. C. Kroon, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 07/944,562

(22) Filed: Sep. 14, 1992

(30) Foreign Application Priority Data

Nov. 19, 1991 (EP) ............................... 91203002

(51) Int. Cl.[7] ................................. G11B 5/09
(52) U.S. Cl. ................ 369/47.3; 369/47.33; 369/53.24; 369/53.34
(58) Field of Search ................ 369/601, 58, 47.28, 369/47.29, 47.3, 47.31, 47.32, 47.33, 47.34, 53.31, 53.34, 53.37, 53.44, 53.45, 53.24, 275.3

(56) References Cited

U.S. PATENT DOCUMENTS 4,862,439 A * 8/1989 Ando et al. .................... 369/58
4,932,016 A * 6/1990 Yoshida et al. ................ 369/59
5,053,898 A * 10/1991 Hashimoto et al. ........... 369/58
5,187,699 A   2/1993 Raaymakers et al. ......... 369/48
5,212,678 A * 5/1993 Roth et al. ..................... 369/60

* cited by examiner

Primary Examiner—Paul W. Huber

(57) ABSTRACT

Apparatus for recording a continuous synchronous information stream in intermediate portions of a recording track on a record carrier, which portions are intermediate between pre-recorded track portions which are to be retained. The track is searched for an intermediate track portion which is released for recording, and such track portion is scanned by a write head. The received information stream is formatted and supplied to an input buffer, from which it is supplied to the write head. The apparatus includes means which, during scanning of an intermediate track portion, detects when a position proximate the end thereof is reached. Read-out from the buffer and recording is then interrupted, and a search is made to position the wite head at a succeeding released intermediate track portion. Read-out from the buffer and recording is then resumed. The rate of read-out and recording is adjusted to maintain a predetermined degree of filling of the buffer. A record carrier as so recorded is also disclosed, as well as read apparatus which includes an output buffer for decoupling the data rates of the information streams produced by the read head and output buffer.

8 Claims, 8 Drawing Sheets

Figure 1:
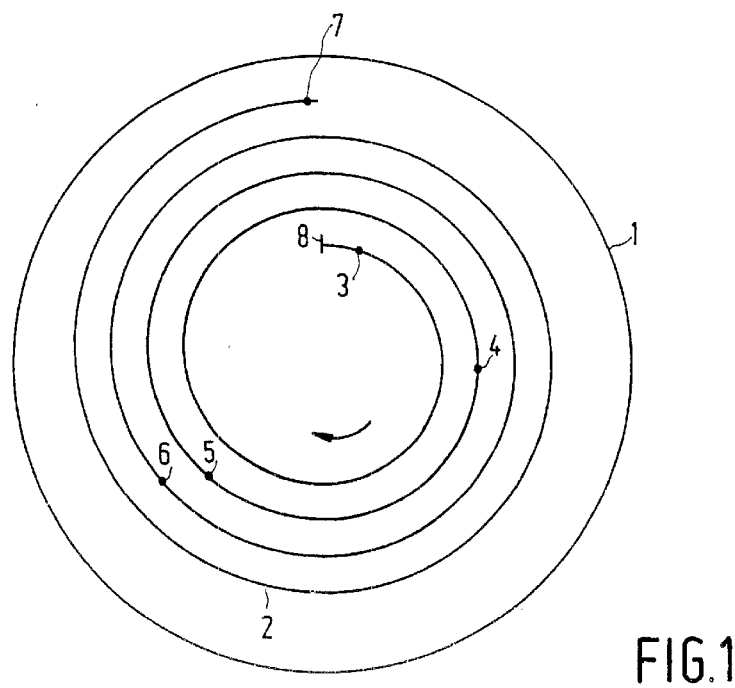

| TNO | p | q | BA | EA |
|-----|---|---|------------|-------------|
| 1 | 1 | 1 | 0'.7".0 | 22'.39".15 |
| 2 | 1 | 1 | 22'.39".16 | 45'.06".09 |
| 3 | 1 | 1 | 45'.06".10 | 58'.12".43 |
FIG.3
| TNO | p | q | BA | EA |
|-----|---|---|------------|-------------|
| 1 | 1 | 1 | 0'.7".0 | 22'.39".15 |
| 2 | 1 | 1 | 45'.06".10 | 58'.12".43 |
FIG.4
| TNO | p | q | BA | EA |
|-----|---|---|------------|-------------|
| 1 | 1 | 1 | 0'.7".0 | 22'.39".15 |
| 2 | 1 | 1 | 45'.06".10 | 58'.12".43 |
| 3 | 2 | 1 | 22'.39".16 | 45'.06".09 |
| 3 | 2 | 2 | 58'.12".44 | 65'.01".10 |
FIG.5
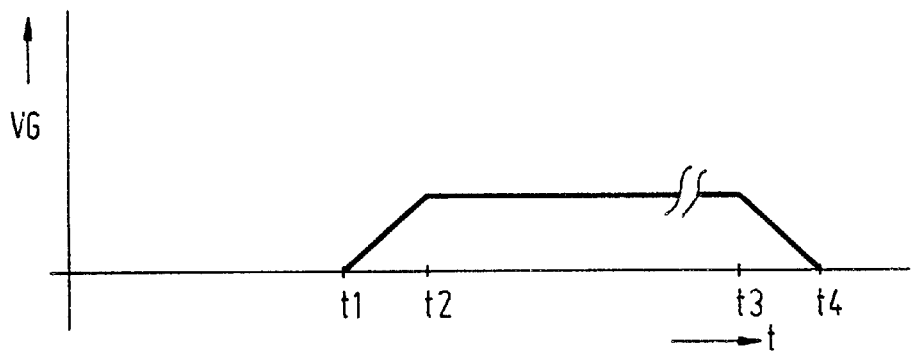
FIG.7
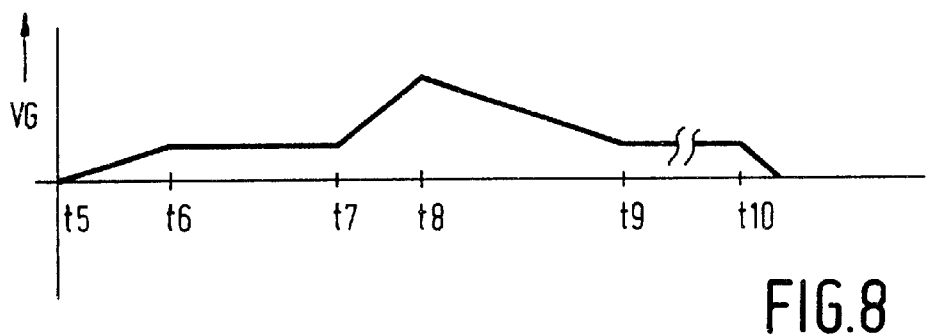
FIG.8

APPARATUS FOR RECORDING A CONTINUOUS INFORMATION STREAM IN AVAILABLE GAPS BETWEEN PRE-RECORDED PORTIONS OF A RECORDING TRACK, RECORD CARRIER SO RECORDED, AND APPARATUS FOR READING SUCH RECORD CARRIER

BACKGROUND OF THE INVENTION

1. Field of the Invention

The invention relates to an information recording device for recording time-synchronous information pieces, particularly audio information pieces which are each supplied as continuous and time-synchronous information streams to an input of the recording device at arbitrary intervals between successive pieces. The recording device comprises search means for searching for portions of a track on the record carrier, scanning means for scanning a searched track portion by means of a write head for writing information patterns in the track, said write head being coupled to the input in order to write an information pattern representing the supplied information stream in the scanned track portion, control means adapted to cause the search means to conduct a search operation, prior to writing of an information patterns for an intermediate portion in the track released for recording, said intermediate portion being located between track portions in which an information pattern which is already present is to be retained, said control means being further adapted to cause the write head to record an information pattern representing the supplied information stream in the searched intermediate portion.

The invention also relates to a record carrier comprising a track in which information patterns are recorded which represent time-synchronous information pieces, particularly audio information pieces.

The invention also relates to an information reading device which comprises search means for searching for identified portions of the track on the record carrier, a read head for scanning the information patterns in the searched track portions and for producing and an information stream corresponding to the scanned information patterns, an output for supplying continuous and time-synchronous information streams, said output being coupled to a signal processing circuit.

2. Description of the Related Art

Such a recording device, reading device and record carrier are known from published European Application EP-A-0 275 972. That Application describes a magneto-optical recording device for recording digitized audio information on a reinscribable record carrier in the form of a magneto-optical disc. A table of contents is recorded on the record carrier, which table indicates the start and end addresses of the track portions in which the information patterns for the relevant information pieces, in this case pieces of music, are provided. If the recording of a given piece of music is no longer desired, the address data for the relevant piece of music are removed from the table of contents. The track portions of the relevant piece of music are then released for recording further pieces of music. The recording device is adapted to provides a display, if desired of, the lengths of the released track portions on a display unit. The user may use this information for selecting the location where another piece of music can be recorded. The user should select a released track portion which is sufficiently long for recording the piece of music. Since the length of the selected track portion will always be larger in practice than the required length, a small part of the released track portion will be left after recording. This small part will often be too small for recording further pieces of music, resulting in a poor utilization of the storage capacity of the record carrier. Moreover, when a piece of music is being recorded, the length of the piece of music cannot always be determined in advance. Consequently, when selecting the track portion released for recording, there is a real risk that the selected intermediate portion may not be not long enough.

SUMMARY OF THE INVENTION

It is, inter alia, an object of the invention to provide a recording device in which released track portions are selected in a more convenient way.

This object is achieved by a recording device as described in the opening paragraph, which is characterized in that the device comprises an input buffer which is coupled to the input for receiving the information stream to be recorded, and an output which is coupled to an input of the write head for supplying such information stream thereto. The device includes means for detecting, during scanning of an intermediate track portion, when a position in such intermediate portion located proximate to the end thereof is reached means for interrupting, in response to such detection, recording of the information pattern and for supply of the information stream from the input buffer to the write head, and control means for effecting, in response to the aforesaid detection, a search for a further track portion released for recording, resumption supply of the information stream from the input buffer to the write head, and resumption of the recording of the information pattern, storage capacity of the input buffer is sufficient to store the supplied information stream during the search for the next released track portion, the device being further provided with means for storing information indicating in which track portions the information patterns representing the individual information pieces are recorded.

Due to the use of the input buffer there need not be any fixed time relation between the information stream received at the input and the information stream supplied to the output processing circuit. This provides the possibility of temporarily interrupting the recording operation, while the continuous reception of a time-synchronous information piece can be maintained. This renders it possible, at the end of a released intermediate track portion, to make a jump to a subsequent released intermediate portion or to the still unused portion at the end of the track. Consequently the released intermediate portions can be more efficiently utilized. Moreover, the selection of a released intermediate portion for recording of a new piece of information is considerably simpler, because any released intermediate portion can be used up to it capacity.

The information thus recorded can be read by means of a reading device as described above characterized in that the device comprises an output buffer having an input which is coupled to an output of the read head, the output of the output buffer being the output of the device, the device being provided with means for interrupting the information streams at the output buffer on the basis of the control information recorded on the record carrier and for repositioning the scanning to another track portion in which information patterns of a subsequent portion of the information piece to be read are provided after reaching the end of a track portion which includes information patterns of a previous portion of the information piece.

Due to the use of the output buffer there need not be a fixed time relation between the information stream from the signal processing circuit to the output buffer and the information stream at the output of the output buffer. This provides the possibility of making track jumps without this being at the expense of the continuous and time-synchronous supply of an information piece at the output of the reading device.

In this connection it is to be noted that the decoupling of information streams in recording and reading devices is disclosed in published European Application EP-A-0 429 139. In the recording and reading device described in therein the decoupling has for its object to enable information to be recorded at a faster rate than at the rate at which the information is supplied, in order that operation of the tracking and focusing servosystem can be continued with an optimum adjustment. However, the information patterns representing the information pieces are not spread over a number of different intermediate track portions.

The invention is eminently suitable for use in combination with the last-mentioned device, because the provisions rendering the decoupling operation possible can then be used for a dual purpose so that the device is used efficiently.

DESCRIPTION OF THE PREFERRED EMBODIMENTS

Figure 2:
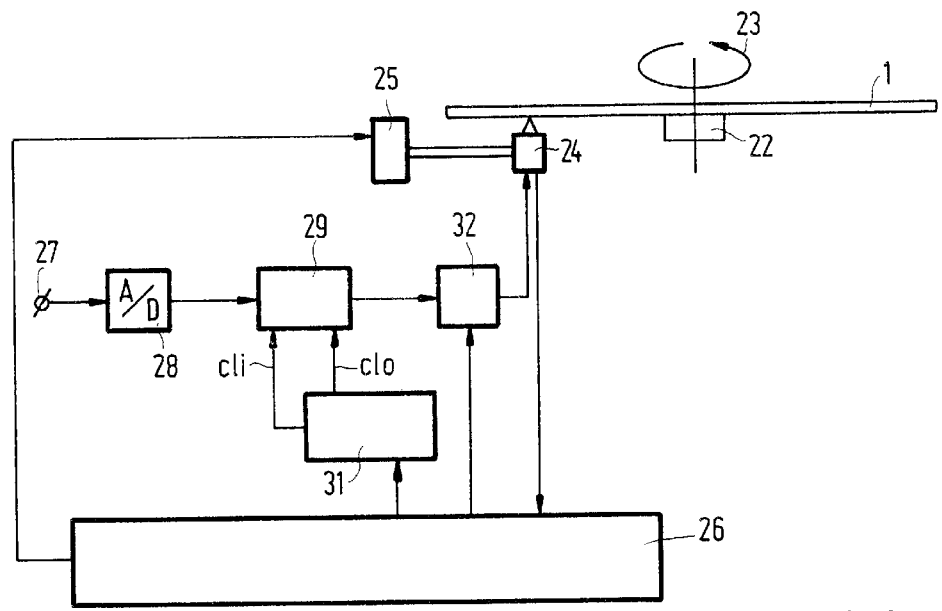
Figure 6:
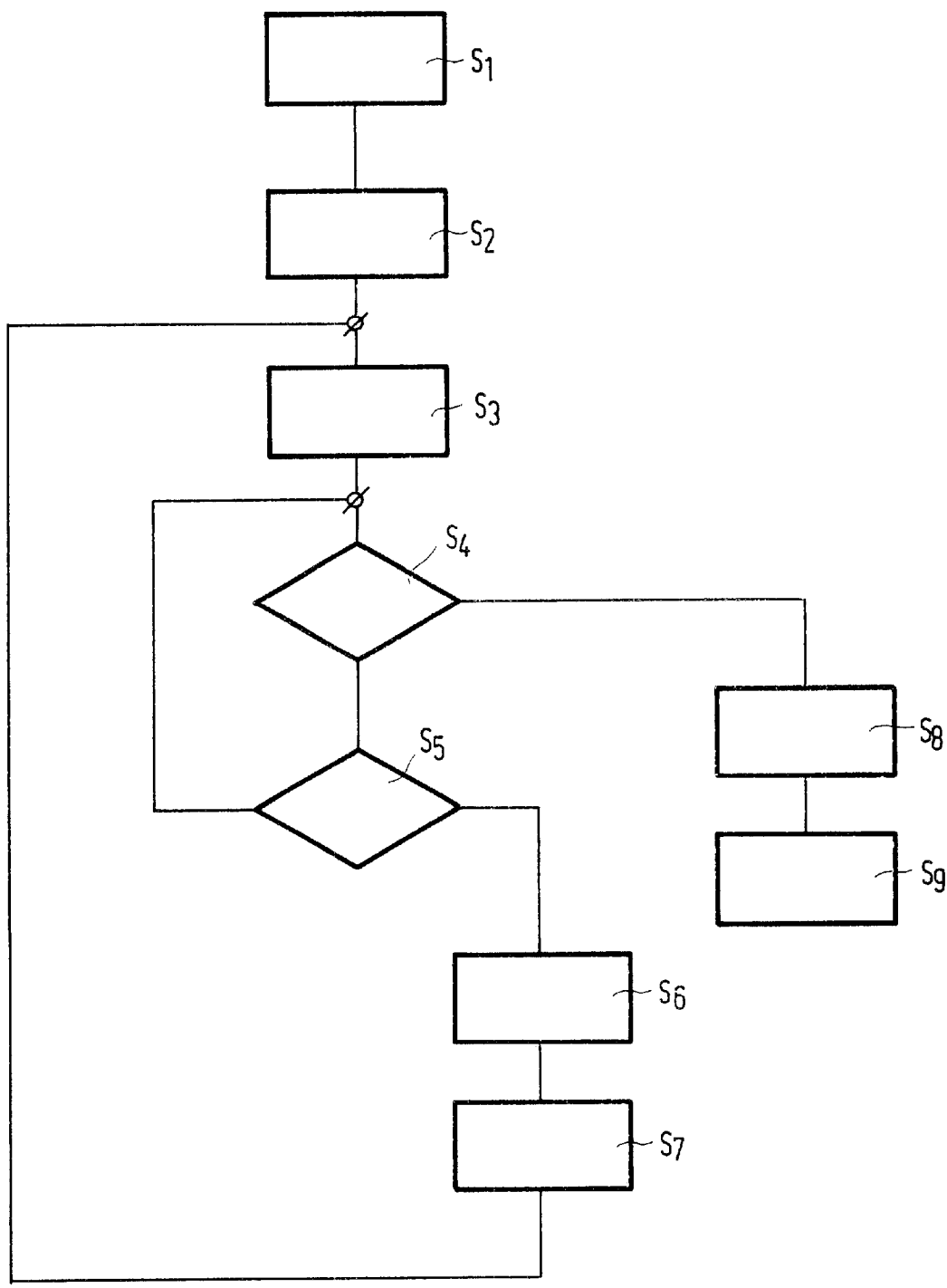
Figure 9:
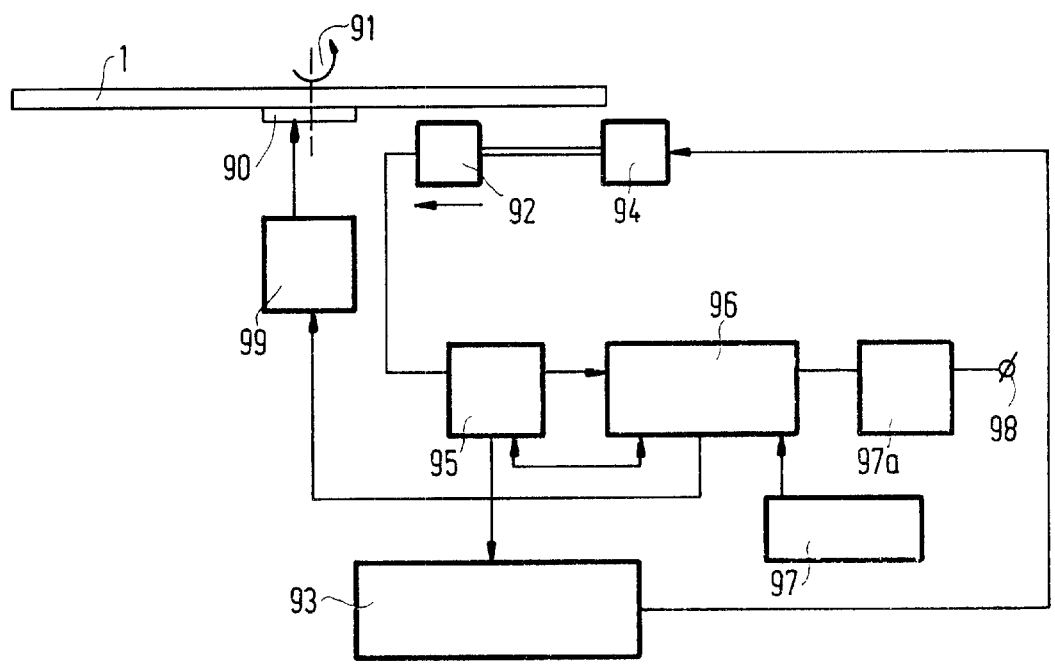
Figure 10:
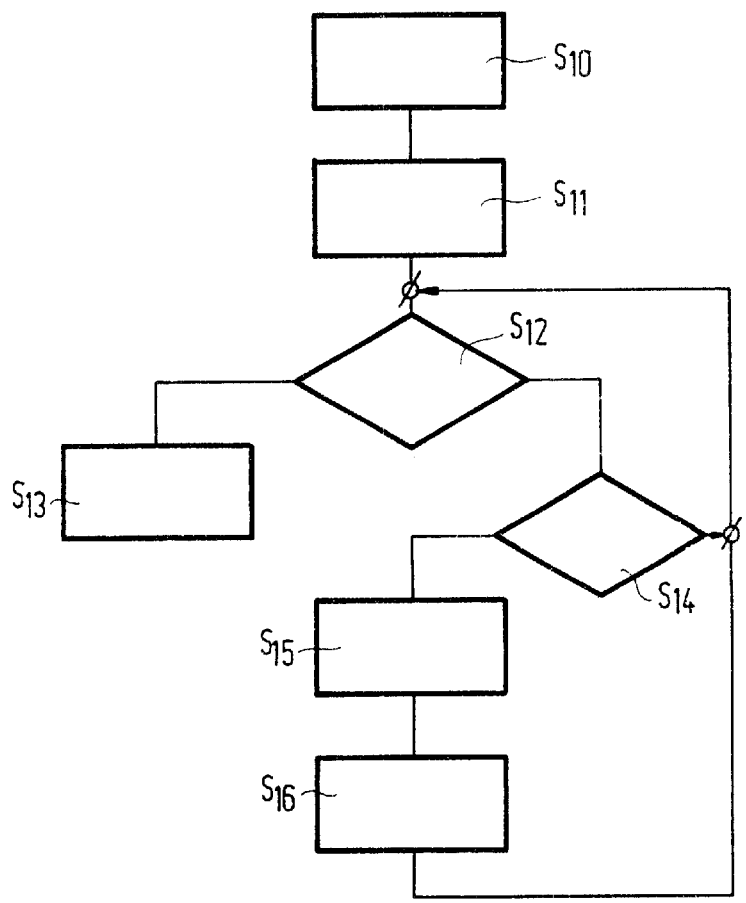
Figure 11:
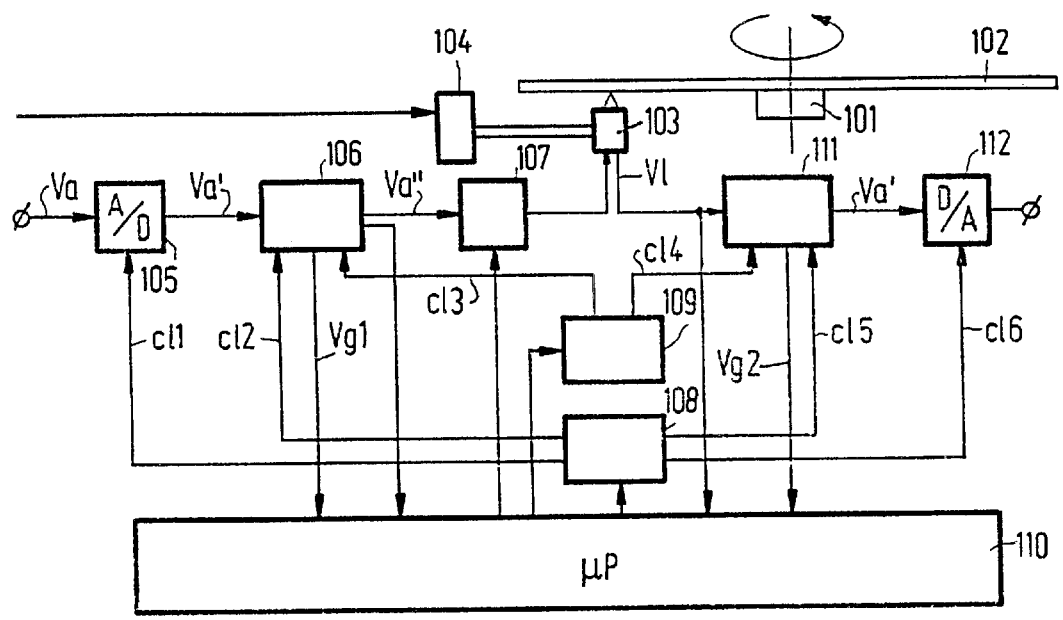
Figure 13:
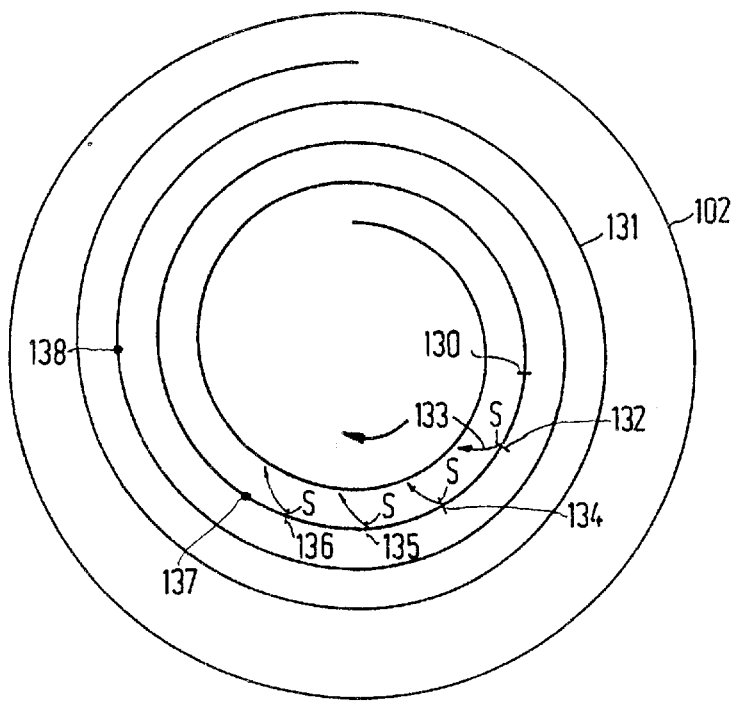
Figure 12:
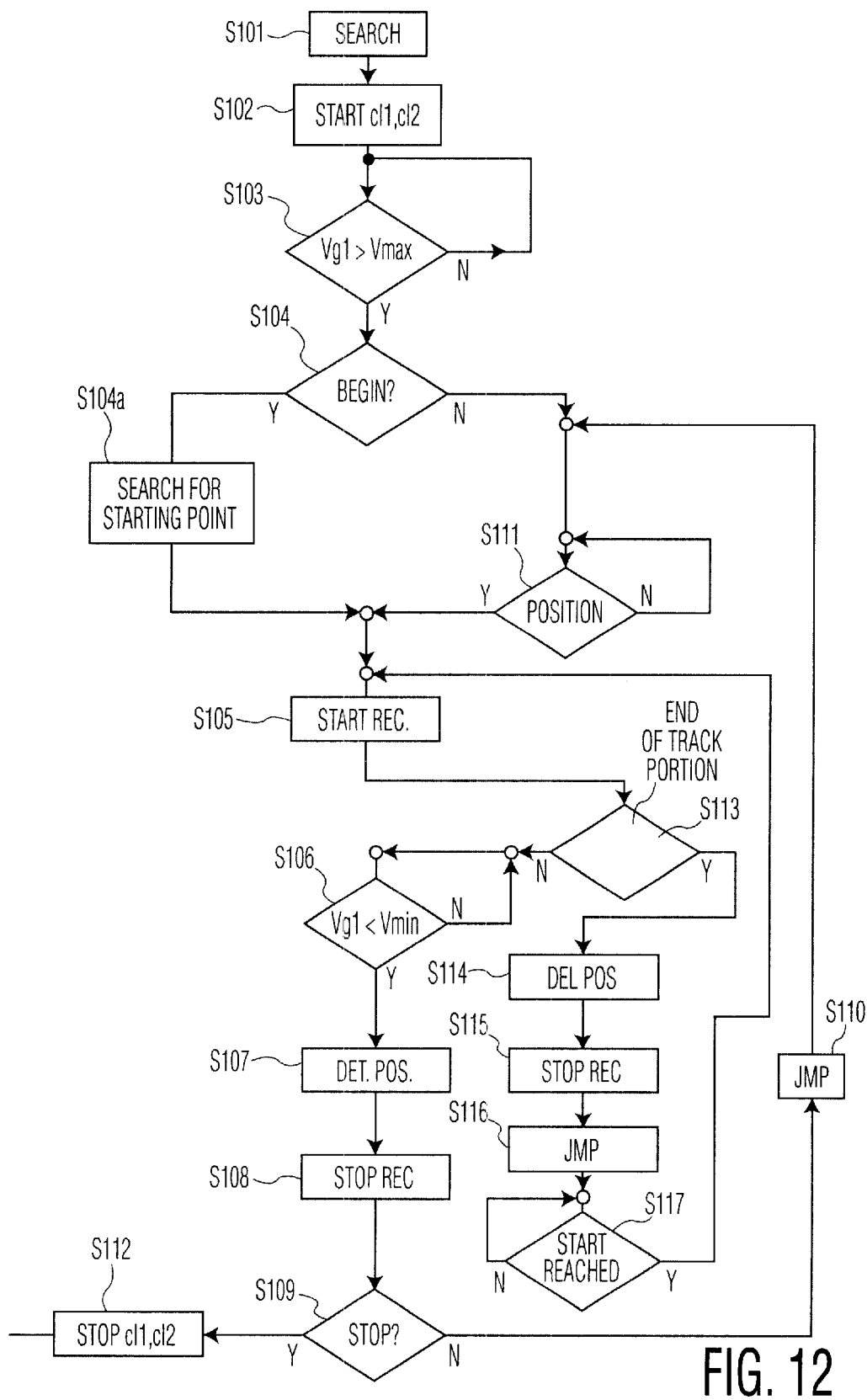
Figure 14:
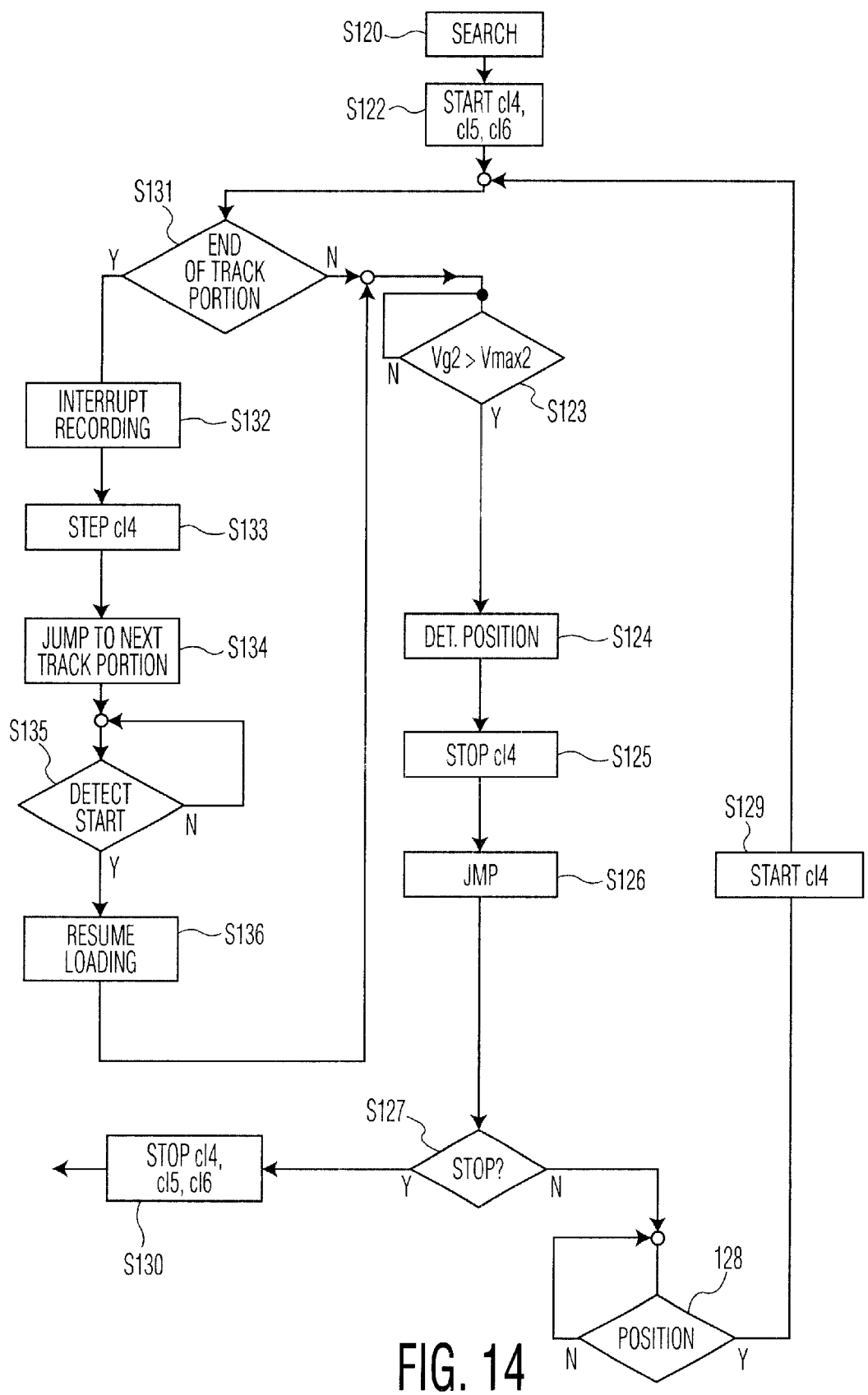
Figure 15:
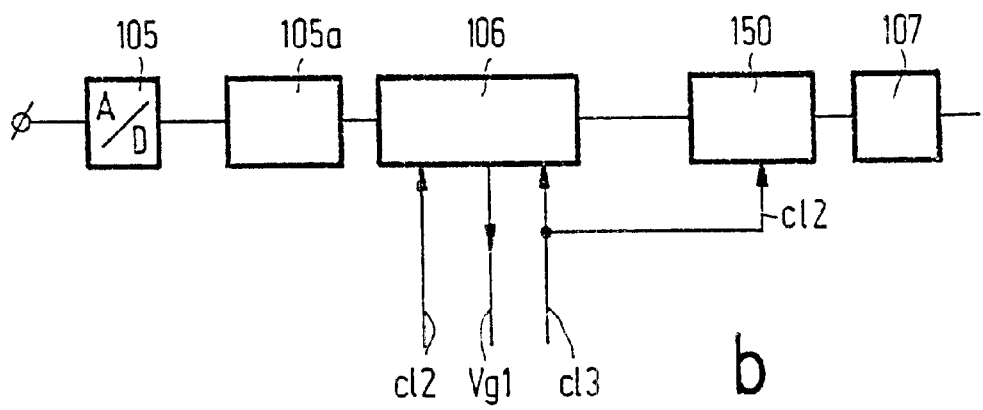
Figure 15:
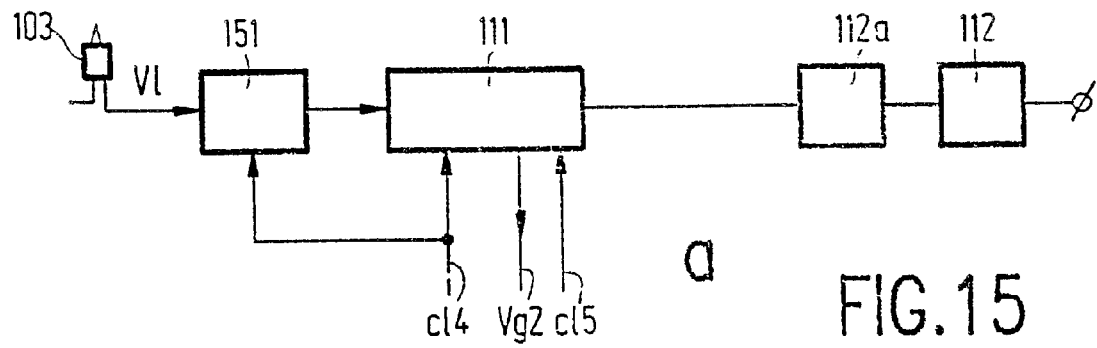

Further embodiments and their advantages will hereinafter be described in detail with reference to FIGS. 1 to 15 in which FIG. 1 shows an embodiment of a record carrier according to the invention, FIG. 2 shows an embodiment of a recording device according to the invention, FIGS. 3, 4 and 5 show examples of tables of contents, FIG. 6 shows a flow chart of a program for controlling the recording operation, FIGS. 7 and 8 illustrate the variation of the filling level of the input buffer as a function of time, FIG. 9 shows an embodiment of the reading device according to the invention, FIG. 10 shows a flow chart of a program for controlling the reading operation, FIG. 11 shows an embodiment of a combined recording and reading system according to the invention, FIGS. 12 and 14 show flow charts of control programs performed by control units in recording and reading systems according to the invention, FIG. 13 is a plan view of a record carrier to illustrate the invention and FIGS. 15a and 15b show adaptations of the system shown in FIG. 12.

FIG. 1 shows diagrammatically an embodiment of a record carrier 1 of a reinscribable type, for example, an optical, magneto-optical or magnetic type. The record carrier 1 shown is disc-shaped, but in principle the invention is also applicable to other record carrier shapes such as, for example tape-shaped record carriers. However, the invention will be described in greater detail with reference to disc-shaped record carriers. The record carrier 1 comprises a spiral track 2 in which information patterns are or can be recorded. The information patterns represent time-synchronous information. Time-synchronous information is to be understood to mean information which becomes available synchronously with time and is to be reproduced synchronously with time. Such time-synchronous information may be audio information or video information. The track 2 of the record carrier shown included the information patterns of three information pieces, viz. a first information piece in the track portion between points 3 and 4, a second information piece between points 4 and 5 and a third information piece between points 5 and 6. The track 2 further comprises a track portion released for further recording, which portion is located between point 6 and the end point 7 of the track. The term track portion is to be understood herein to mean an uninterrupted portion of the track which comprises only information patterns of one and the same information piece or which is released in its entirety.

The record carrier 1 also comprises contents information indicating the start and end addresses of the track portions in which the information pieces are recorded. This contents information may be incorporated, for example in a table of contents which is recorded on a portion of the track intended for this purpose. Such a portion may be located, for example at the beginning of the track 2, between the points 8 and 3. If the start and end addresses are indicated by an absolute time code, as is common practice with Compact Disc signals, FIG. 3 shows an example of a suitable table of contents. The table of contents comprises the start addresses BA and the end addresses EA of the track portions in which information is already recorded and which are not released for recording new information. Column TNO states with which information piece the information in the relevant track portions is associated. Column p denotes the number of track portions used for recording the relevant information piece. Column q states the sequential number of the track portion within the series of successive track portions in which the relevant information piece is recorded. Column BA comprises the start addresses, expressed in absolute time codes, of the recorded information pieces, while column EA indicates the end addresses of the relevant track portion. If the recording of one of the information pieces, for example, the second information piece in the table of FIG. 3 is no longer necessary, the address information of the track portions in which the relevant information piece is recorded can be removed from the recorded table as is shown in FIG. 4. The track portion originally occupied by the second information piece (also referred to as intermediate portion) may be used for recording a new information piece.

In the recording method according to the invention the information of an information piece is spread over a number of non-adjacent track portions. This is particularly advantageous if no single track portion available for recording is long enough to record the complete information piece. In that case the method according to the invention provides the possibility of spreading the information over two or more non-adjacent track portions.

Moreover, the manner of recording is very convenient because the disc player itself determines which released track portions are to be used for recording. Thus, the user need no longer select a released track himself.

A recording device in accordance with of the invention with which this can be realised is shown in FIG. 2. The recording device comprises a read/write head 24 of a conventional type. To obtain a scanning of the tracks of the record carrier 1, the record carrier 1 is moved along the read/write head 24 by means of a drive motor 22 which rotates the record carrier around a shaft 23. The radial position of the scanning is then conventionally controlled in such a way that the point of scanning is substantially held on the track of the record carrier. The address of the scanned track portion is determined by a control unit 26 in a conventional manner, for example, on the basis of read signals supplied by the read/write head 24. For searching for desired track portions, the device is provided with a displacement mechanism 25 for radially displacing the point of scanning under the control of the control unit 26. The recording device has an input 27 for receiving time-synchronous information pieces which are intermittently applied to the input 27. The time-synchronous information received at the input 27 is arranged in accordance with a suitable format by means of a signal processing circuit 28. The information thus arranged is converted by a write control circuit 32 into a suitable write signal for the read/write head 24, which in response to the write signal provides an information pattern in the track of the record carrier, which pattern represents the information supplied. An input buffer 29 is arranged between the input 27 and the control circuit 32. The input buffer 29 is of a conventional type in which supplied information can be temporarily stored before this information is supplied again and in which information can be stored at a rate which is independent of the rate at which the stored information is supplied. Such an input buffer may be a FIFO buffer in which the storage and supply of information is controlled by means of two clock signals cli and clo which are independent of each other. In the embodiment shown the recording device comprises a clock signal generator 31 for generating the clock signals cli and clo for controlling the storage and supply, respectively, of information in/by the input buffer 29.

In the embodiment of FIG. 2 the information is first applied to the signal formatting circuit 28 and subsequently to the input buffer 29. However, the input buffer 29 and signal formatting circuit 28 may be arranged in the reverse order. The control unit 26 may be processor of a programmable type which is loaded with a suitable control program for controlling the recording. FIG. 6 shows a flow chart of a suitable control program. A control program is called, for example in response to a recording assignment which is signified by the user to the control unit 26 via an operating panel. The program comprises a step S1 in which a track portion released for recording is selected on the basis of the table of contents. If the contents of the table of contents correspond to the contents of the Table shown in FIG. 4, the track portion which is located between addresses 22'.39".15 and also 45'.06".10 and the track portion beyond address 58'.12".43 will be suitable for the recording operation. Prior to the recording operation it should be determined in which one of the available track portions the recording operation will start. It will be evident that various selection procedures are possible for this purpose, with which procedures a selection is made from among the available released track portions. Such selection may or may not be in dependence upon the length of the information piece to be recorded. In the embodiment described hereinbefore the first released track portion is selected each time. To prevent an information piece from being recorded in many very small track portions, it is, however, preferable to disregard track portions which are smaller than a given minimum length, for example a length corresponding to 30 seconds of the information piece.

In step S2 the start of the selected released track portion is searched for by means of the address 22'.39".16 which indicates the location of the start of such track portion. Subsequently, the recording operation is started while performing step S3. Step S3 is followed by step S4 in which it is checked whether the recording operation of the new information piece to be recorded must be terminated. If not, step S5 is subsequently performed in which it is checked whether the end of the track portion released for recording and indicated by address 45'.06".09 is reached. If negative, the program is continued with step S4. If positive, step S6 is performed. When step S6 is being performed, the recording operation is interrupted. This means that the supply of the information present in the input buffer 29 to control circuit 32 is interrupted and that the read/write head 24 is brought, via the control circuit 32, to a state in which no information patterns are recorded. It is preferred to provide a distinguishable control pattern at the end of the recorded information, which pattern indicates this end. This has the advantage that the last portion of the information piece provided in the relevant track portion can be simply and accurately determined during the reading operation.

The quantity of information in the input buffer 29 will increase due to the interruption of the supply of information from the input buffer 29, because the supply to the buffer of information to be recorded is still continued at the input 27. For the purpose of illustration FIG. 7 shows the filling level VG (here defined as the ratio between the quantity of information stored in the buffer, divided by the total storage capacity) of the input buffer 29 as a function of time t. The instant t1 indicates the instant when the supply of information from the input buffer is interrupted during the execution of step S6. After the execution of step S6, step S7 is performed in which there is a search for the start of a subsequent track portion which has been released for recording. In this example this is the track portion having the address 58'.12".44. As soon as this track portion has been found, step S3 is performed again, in which step the recording operation is resumed. It is preferred to incorporate a distinguishable control pattern at the start of the recorded information, which pattern indicates this start. When the information is being read, the start of the portion of the information piece in the relevant track portion can then be determined simply and accurately. The use of control patterns indicating the start and the end of the information recorded in the track portion considerably facilitates the combination of the information from the different track portions during the reading operation.

In FIG. 7 the instant of resuming the recording operation is denoted by t2. At this instant the supply of information from the input buffer is resumed and the filling level VG of the input buffer will not increase any further.

As soon as it is ascertained during the execution of step S4 that the recording operation can be ended, step S8 is performed. When this step is performed, the storage of information in the input buffer 29 is discontinued. The supply of information by the input buffer may then continue until the input buffer is completely empty. Furthermore, the read/write head 24 is controlled to a state in which information patterns are no longer provided. In FIG. 7 the instant when the storage of information in the input buffer is discontinued is indicated by the instant t3. The instant when the supply of information by the input buffer is discontinued is denoted by t4. In step S9 the table of contents is adapted to the address information indicating the start and end addresses of the track portions in which the information patterns of the information piece to be recorded are provided. FIG. 5 shows the table of contents for the example described. It will be evident to those skilled in the art that the way in which the address information is incorporated in the table of contents can be realised in numerous other ways than is shown in FIG. 5. It is further to be noted that the links between the different track portions may also be indicated in a manner other than with a table of contents. For example, if a sub-code is added to the recorded information during recording of the information piece it is possible to incorporate said link between the track portions in the sub-code of the information recorded in the track portion.

Once again it is to be noted that it is preferred to release only track portions which exceed a given minimum length, for example a length which is sufficient to record information having a length of 30 seconds. It is thereby prevented that an information piece must be spread over a very large number of track portions and recorded, resulting in the information about the links between the track portions used becoming very extensive. Moreover, due to the restriction that the track portions used for recording should have a minimum length it is achieved that after making a jump to a subsequent track portion there is sufficient time to empty the input buffer to a sufficient extent before a new jump must be made to a subsequent released track portion.

It is alternatively possible to impose a maximum, for example five, on the number of track portions used for recording an information piece.

The information about the addresses of the track portions used for recording the information pieces is preferably recorded on the record carrier itself. However, if the recording device is provided with a non-exchangeable record carrier, this information may alternatively be recorded in a non-volatile memory of the recording device itself.

In the example described hereinbefore the rate at which the information is supplied by the input buffer is equal to the rate at which the information is loaded into the buffer. This means that the filling level of the input buffer will increase during each jump to a subsequent track portion released for recording. All this means that the permissible number of jumps to subsequent released track portions is limited by the buffer capacity. This drawback can be obviated by rendering the rate of supply and the recording rate dependent on the filling level of the input buffer. For example, it is possible to temporarily increase the supply and recording rates when there is a high filling level, until a given lower filling level is reached.

Moreover, to prevent the buffer from getting empty, the supply and recording rates can be chosen to be lower than the storage rate when the filling level is below a given value.

FIG. 8 shows the variation of the filling level VG as a function of time for the case where the supply rate is controlled in accordance with the principle described hereinbefore. The instant of starting the recording operation is denoted by t5. At this instant the loading of information into the input buffer 29 is initiated. Moreover, the supply of information from the buffer is started at a lower rate than the load rate of the information. This means that the filling level increases. At the instant t6 the filling level VG exceeds a threshold D. In response to this level exceeding the threshold the supply rate from the buffer is rendered equal to the load rate, so that the filling level of the buffer remains constant. At the instant t7 the end of a released track portion used for recording is reached and a jump is made to the start of a subsequent released track portion, resulting in the supply of information from the input buffer being interrupted. The filling level VG will now increase. At the instant t8 the recording operation in the newly searched track portion is initiated. Since the filling level of the input buffer is above the threshold D, the supply rate is increased to a value which is larger than the load rate in order that a decrease of the filling level VG is again then obtained. At instant t9 the threshold value D is reached and so the supply rate is again rendered equal to the load rate. The filling level VG now remains constant. At instant t10 the supply of information to the input buffer 29 is ended. The filling level will now decrease until an buffer is entirely empty at an instant following instant t10, and the supply and recording operations are terminated.

FIG. 9 shows an embodiment of a reading device for reading the information pieces on record carrier 1. The reading device comprises a motor 90 for rotating the record carrier 1 around a shaft 91. A read head 92 of a conventional type for scanning the track 2 on the record carrier 1 is arranged opposite the rotating record carrier 1. For searching for desired track portions, the point of scanning can be radially displaced across the record carrier by means a displacing mechanism 94 under the control of a control unit 93. During scanning of the track the read head supplies a read signal which represents the recorded information pattern in the track 2. The read signal is applied to a signal processing circuit 95 which regains a data clock signal and the recorded information from the read signal. The regained information is applied to an input of an output buffer 96. The regained data clock signal is also applied to a clock input of the output buffer 96 to control the loading of the output buffer 96 with the supplied information at a rate which is fixed by the frequency of the data clock signal. The output buffer 96 is of a type in which information can be loaded therein at a rate which is independent of the rate at which the information is supplied therefrom. Since the recorded information pieces relate to time-synchronous information, the rate at which the information is supplied from the output buffer should be very constant. This is realised by controlling the supply of therefrom with a clock signal of a very constant frequency which is supplied by a clock signal generator 97. The information supplied by the output buffer 96 is applied to an output 98 of the reading device via an output stage 97a. The output buffer 96 is of a conventional type which supplies a signal which is indicative of its filling level. This signal is applied to a motor drive circuit 99 which controls the rotational speed of the motor in such a way that the filling level of the output buffer is controlled to a given reference value. The reading operation is controlled by the control unit 93, which is provided with a suitable control program for this purpose. A flow chart of a possible example of such a control program is shown in FIG. 10. This program starts with step S10. During the execution of this step the table of contents is read and subsequently a waiting time is observed for a read command for an information piece which can be selected by the user via an operating panel. After the read command has been given, the start of the first track portion which was used for recording the selected information piece is searched for during the execution of step S11 on the basis of the information read from the table of contents. As soon as the start of the selected portion of the information piece recorded in the searched track portion is detected, the information reading operation and the operation of storing this information in the output buffer 96 are started during the execution of step S11. Furthermore, the supply of information from the output buffer 96 to the output 98 is initiated. Subsequently it is checked in step S12 whether the end of the recorded information piece has been reached. This may be effected, for example, on the basis of the information incorporated in the table of contents. However, it is alternatively possible that a sub-code indicating the end is added to the recorded information. In that case the end can be detected on the basis of the sub-code which has been read. If during the reading operation the end of the information is detected, step S13 is performed in which the reading operation is terminated. However, if the end of the information piece has not yet been detected, step S12 is followed by step S14. When performing this step it is checked whether the end of a track portion, which is not the end of the information piece, has been reached. This check can be performed on the basis of the information in the table of contents. However, if control patterns indicating the end are incorporated at the end of the recorded information, the check is preferably performed on the basis of these control patterns. If it is ascertained during the execution of step S14 that the end of the track portion has not been reached, step S14 is followed by return to step S12. However, if it has been ascertained that the end of the track portion has been reached, step S15 is performed. In step S15 the reading of information and storage thereof in the output buffer 96 are interrupted, while the supply of information from the output buffer 96 is maintained. Subsequently step S16 is performed in which the is a search for the start of the next track portion in which information patterns of the relevant information piece have been recorded. This searching operation is carried out on the basis of the start addresses of the track portions. As soon as the desired track portion has been located, the start of the recorded information is detected, preferably on the basis of control patterns which are provided at the start of the recorded information. As soon as the start of the recorded information has been found, the reading and loading operations of the output buffer 96 are resumed. Subsequently step S12 is performed again. During interruption of the information reading and loading operations the filling level of the output buffer will decrease. After the reading and loading operations of the output buffer have been resumed, the speed of the motor 90 will increased as a result of the decreased filling level. Consequently, the read and load rates increase so that the filling level will increase to the desired level again. This level should be chosen in such a way that sufficient information is available in a output buffer during the search for a next track portion so as to guarantee an uninterrupted supply of information to the output. The time required for searching for a subsequent track portion is less than 1 second in conventional reading devices. This time determines the required storage capacity of the output buffer and the desired filling level. Due to the restriction that the track portions used for recording should have a minimum length, it is also achieved that there is sufficient time available for filling the output buffer 96 to its filling level after a jump has been made to a subsequent track portion.

FIG. 11 shows a further embodiment of a combined recording and reading system according to the invention. The device comprises a motor 101 for rotating a disc-shaped optical record carrier 102 about its shaft, which carrier is of a reinscribable type and has a spiral track. A read/write head 103 by which a track on the record carrier 102 is scanned with a radiation beam for reading and recording information is arranged opposite the rotating record carrier 102. The system is provided with a tracking system of a conventional type (not shown) which ensures that the centre of a scanning spot produced by the radiation beam on the record carrier substantially coincides with the centre of the track. Furthermore the device is provided with a focus control (likewise not shown) for keeping the scanning beam focused on the record carrier, a scanning rate control system of a conventional type (not shown) for controlling the rate at which the record carrier 102 is moved along the read/write head 103. The read/write head 103 can be displaced radially with respect to the record carrier 102 by means of a radial displacing mechanism 104.

The recording and reading system further comprises a circuit 105 for digitizing a time-synchronous audio or video signal Va. Such a circuit may comprise, for example a clock-controlled A/D converter. In addition to the A/D converter, the circuit 105 for digitizing the analog signal may also comprise a digital processing circuit for compressing the digital signal supplied at the output of the A/D converter. It is not necessary that the information to be recorded be in analog form. This information may equally well be in digital form and converted by a digital processing circuit such as, for example, a standard digital audio interface circuit, before being recorded. When the A/D converter is used, the bit frequency of the digitized signal Va' is dependent on the desired quality of the digitized signal which is determined, inter alia, by the number of bits per signal sample and the sampling frequency. However, the use of data compression techniques may decrease the bit frequency without any noticeable loss of quality. An input buffer of a type as already described hereinbefore is denoted by reference numeral 106. The input buffer 106 is arranged between the circuit 105 and the write control circuit 107 for supplying a write signal to the read/write head 103. The input buffer 106 is loaded at a rate which corresponds to the bit frequency of the digitized signal Va' at the output of the circuit 105. The information stored in the input buffer 106 is retrieved and subsequently applied to a data input of the write control circuit 107 at a retrieval rate which is related to the scanning rate during the recording operation.

For the control of the circuit 105 and the control of the loading of input buffer 106, the device is provided with a clock signal generator 108 for supplying a clock signal c11 for the circuit 105 and a clock signal c12 for the input buffer 106, which signal is related to the clock signal c11.

A second clock signal generator 109 applies a retrieval clock signal c13 to the input buffer 106 for retrieving the information stored in the input buffer 106, the retrieval clock signal c13 having a frequency which is related to the scanning rate during the recording operation. The recording control may be performed in such a way that, as soon as the filling level of the input buffer exceeds a given upper limit, an information retrieval and recording procedure is performed in which the information stored in the input buffer 106 is retrieved and is subsequently recorded. Retrieval and recording of information is continued until the filling level has fallen below a given lower limit, whereafter the retrieval and recording process is discontinued until the filling level has exceeded the upper limit again. For such a control the system is provided with control unit 110, for example microprocessor of a programmable type. The control unit 110 is coupled to the radial displacing system 104 for realising, by means of applying a control signal, a scanning jump in the radial direction to a given portion of the track which is indicated by a desired destination address. Furthermore, the control unit 110 is coupled to the clock signal generators 108 and 109 for activating and deactivating the supply of the clock signals supplied by the generators 108 and 109. The control unit 110 also applies a control signal to the write control circuit 107. The write control circuit 107 is formed in such a way that, dependent on the received control signal, the read/write head 103 can be set to either the read mode or the write mode. In the read mode the read/write head 103 supplies a read signal V1 which represents the information recorded at the location of the scanning in the track portion scanned by the read/write head 103. In the write mode, information received at the data inputs of the control circuit 107 is recorded by means of the read/write head 103. For controlling the recording and the control unit 110, the input buffer 106 also supplies an indication signal Vg1 which is indicative of the filling level of the input buffer 106. Moreover, an output signal of the input buffer 106 representing the retrieved information is applied to the control circuit 107. Finally, the read/write head 103 is coupled to the control unit 110 for supplying the read signal V1 to the control unit 110.

The recording control will hereinafter be explained with reference to FIG. 12 showing a flow chart of a suitable control program and FIG. 13 which is a plan view of the record carrier 102.

The program flow chart is shown in FIG. 12 comprises a step S101 which is performed if a recording of the analog information applied to the circuit 105 is desired. During the execution of step S101 the control unit 110 moves the read/write head 103 to the start of the track 102 in which the table of contents is recorded and the table of contents is read. Based on the table of contents which has been read, the track portions released for recording are determined, in which portions the supplied information is to be recorded. Finally, a search for the first released track portion selected for recording is conducted during step S101. Subsequently, the circuit 105 is activated by activating the generation of the clock signal c11 during the execution of step S102. It is to be noted that it is not necessary for the activation of the circuit 105 to be delayed until the read/write head 103 has reached the desired position. This may also take place prior to searching for the desired position. The digitized information at the output of circuit 105 is loaded into the input buffer 106, synchronously with the loading clock signal c12. After the execution of step S102 it is ascertained, during the execution of step S103, with reference to the filling level indication signal Vg1, whether the filling level of the input buffer 106 has exceeded a given value Vmax. As soon as the filling level has exceeded this value it is checked in step S104 whether the information stored in the input buffer 106 relates to the first packet of information to be recorded. If positive, the point on the track where the recording can start is searched during the execution of step S104a, which is effected in a way as described, for example, in published European Patent Application EP-A-0 325 329, which corresponds to U.S. Pat. No. 5,187,699, issued Feb. 16, 1993, assigned to the present assignee. Subsequently, the recording operation is started during the execution of step S105. When step S105 is performed, the generation of the retrieval clock signal c13 is activated so that the information stored in the input buffer 106 is supplied to the control circuit 107 synchronously with the retrieval clock signal c13. During the execution of step S105 the read/write head 103 is also set to its write mode, resulting in the information applied to the control circuit being recorded. For the purpose of illustration reference numeral 130 in FIG. 13 indicates the point where the recording operation starts in a spiral track 131. After execution of step S105 it is checked during the execution of step S113 whether the end of the track portion released for recording has been reached. If negative, step S105 is followed by step S106.

The rate at which the information is retrieved from the input buffer 106 is higher than the rate at which the input buffer 106 is loaded, so that the filling level of the input buffer 106 will decrease during the recording operation. In step S106 it is checked whether the filling level of the input buffer 106 has fallen below a given limit value Vmin. If so, the point in the track where the recording operation is to be interrupted is determined during the step S107. Moreover, information indicating this point is stored, for example in the memory of the microcomputer 110. If the recorded information comprises address information, the point where the recording operation must be interrupted can be coarsely fixed in means of an address comprised by the information. The exact position of the interruption can be indicated by a synchronization code which is recorded at a predetermined point with respect to the point of interruption. This synchronization code may consist of a code which is distinguishable from the information and which is specially added to the recording information for this purpose. If the information to be recorded already comprises synchronization codes such as, for example the EFM synchronizing signals or the sub-code synchronizing signals in a standard CD signal, these codes are preferably used to indicate the exact position of interruption of the recording operation. This may be realised, for example, by interrupting the recording operation at a fixed instant after recording the next synchronization code and after the filling level has come below the limit value Vmin. The actual interruption of the recording operation is realised in step S108. In this step the read/write head 103 is set to its read mode at the instant when the position has been reached where the recording operation must be interrupted, and simultaneously the supply of information from the input buffer 106 is interrupted by deactivating the generation of the retrieval clock signal c13. In FIG. 13 the point at which the recording in the track 131 is interrupted is denoted by the reference numeral 132. After the execution of step S108 it is ascertained during step S109 whether all packets of information have already been recorded. If negative, step S110 is performed in which a jump of the read/write head across one or more tracks is realised towards a turn of the spiral track which precedes the track portion in which the recording has been interrupted. The jump is denoted by arrow 133 in FIG. 13. As a result of the radial jump a track portion is scanned which is located before the point 132 where the recording was interrupted. During the execution of step S111 it is checked with reference to the read signal V1 whether point 132 has been reached again. This may be effected, for example, by comparing the address information obtained during reading with the stored address which roughly indicates the position where the recording was interrupted. Subsequently the exact position of the interruption can be determined by detecting the next synchronization code in the read signal V1 after conformity between said addresses has been ascertained. After detection of the exact position of the interruption the recording operation is resumed by performing step S105. It is to be noted that the instant of resuming may alternatively be determined in dependence upon the filling level instead of in the manner as described hereinbefore. For example, it is possible to observe a waiting time for the resumption of the recording operation until the filing level of the input buffer 106 has exceeded a given maximum value and to subsequently search the point where the recording operation was interrupted. When the entire signal is being recorded, the recording operation is each time interrupted temporarily in the positions in the track 131 denoted by the reference numerals 133, . . . , 136. This process of interrupting and resuming the recording operation continues until in step S109 the last packet of the information to be recorded is detected and step S112 is performed. During the execution of step S112 the digitization of the information applied to the A/D converter 105 and the loading of the digitized information in the input buffer 106 is discontinued by deactivating the loading clock signal c12 and the clock signal c11. It is to be noted that, in general, the input buffer 106 is then not completely empty. This is not a problem when recording audio signals because only a very short signal portion is concerned. However, if recording of the complete audio signal is desired, the contents of the input buffer may be supplemented with a signal which represents silence and the point at which the recording operation is terminated may be chosen to be such that the stopping instant occurs while the signal representing this silence is being recorded.

If it is detected during the execution of step S113 that the end (denoted by point 137 in FIG. 13) of the released track portion being used for recording has been reached, step S114 is carried out. In step 114 the point where the recording must be discontinued is determined on the basis of the information, present in the player, about the instantaneous position of the scanning spot and the end point of the released track portion. In step S115 the actual interruption of the recording operation is realised. The recording operation is preferably terminated at the end of the track portion with the recording of an end pattern which is unique for the code and indicates the end of the information recorded in the relevant track portion. This end pattern may be used for detecting the end of the portion of the information piece in the relevant track portion when the track is being read at the decoder level at a later stage. Similarly as in the execution of step S108 the read/write head 103 is set to its read mode and the supply of information from the input buffer 106 is interrupted. Subsequently a jump is made during the execution of step S116 to a point (denoted by point 138 in FIG. 13) which is located before the start of the next track portion released for recording. In the execution of step S117 it is detected, on the basis of the address which has been read, whether the start of this released track portion has been reached. If so, subsequently the recording operation is resumed by continuing the program with step S105. The recording operation preferably starts by providing a unique starting pattern which directly precedes the recording of the information patterns representing the information piece to be recorded. This unique starting pattern provides the possibility of simply and accurately determining, during the reading operation, the start of the part incorporated in the relevant track portion of the information piece to be read.

It is further to be noted that when checking in step S113 whether a jump must be made to a subsequent (non-contiguous) track portion, a track jump may just have been performed within the track portion then instantaneously in use (during the execution of the steps S110, S104 and S111). This means that the input buffer 106 may be already filled at the start of the jump to the next track portion. It is therefore necessary that the capacity of the input buffer be sufficiently large to also store the synchronous information received via the input during the entire period of the jump to the next track portion.

The required storage capacity of the input buffer may be reduced as follows. Based on the instantaneous filling level of the input buffer 106, the instantaneous recording address and the end address of the track portion, the instant when the last track jump is to be performed within the track portion then instantaneously in use can be determined in order that the input buffer 106 will be substantially empty at the start of the jump to the next track portion.

The recorded information can be read by scanning the track in which the information has been recorded by means of the read/write head 103 which must be set to the read mode for this purpose. The read/write head 103 supplies the read signal V1 which can be loaded into an output buffer 111 synchronously with a load clock signal c14 generated by the clock signal generator 109. The information loaded into the output buffer 111 is retrieved synchronously with a retrieval clock signal c15 generated by the clock signal generator 108. The retrieved information is applied to a D/A converter 112 which is controlled by a clock signal c16 which is also generated by the clock signal generator 108. Recorded information in an analog form is supplied at the output of the D/A converter 112. The frequency of the load clock signal c14 is chosen to be such that the rate at which the output buffer 111 is loaded corresponds to the scanning rate during reading of the information. The frequencies of the clock signals c15 and c16 are chosen to be such that the rate at which the analog information is supplied at the output of the D/A converter 112 corresponds to the rate at which this information is received by the A/D converter 105 so that a high fidelity reproduction of the recording information is obtained during reading. The information is being read under the control of the control unit 110 which is loaded with a suitable program for this purpose.

FIG. 14 shows a flow chart for an example of a suitable read program for control unit 110. This program comprises a step S120 in which, under the control of the control unit 110, the read/write head 103 is put opposite the track portion in which the information to be read has been recorded. Subsequently the reading operation is started in step S122 by activating the supply of the clock signals c14, c15 and c16. As a result of the activation of the clock signal generation, the information read is loaded into the output buffer 111 at a rate which corresponds to the read rate. The stored information is retrieved from the output buffer 111 synchronously and at a lower rate than the loading rate and subsequently converted into an analog form by the D/A converter 112. Step S122 is followed by step S131 in which it is checked whether the end of the track portion has been reached in which a part, but not the last part, of the information piece has been recorded. If this end is not yet reached, the program continues with step S123. When performing this step the filling level which is indicated by an indication signal Vg2 generated by the output buffer 111 is compared with a maximum value Vmax2. As soon as the filling level exceeds this maximum value, step S124 is carried out in which the position is determined where the storage of the information which has been read can be interrupted. This may be realised similarly as determining the interruption during recording with reference to the address information indicating the point of scanning and the synchronization codes incorporated in the recorded information. When this position is reached, the reading of information and the storage of information in the output buffer 111 is stopped during the execution of step S125 by deactivating the generation of the clock signals c14. In step S126 a radial scanning jump is subsequently made towards a turn of the spiral track preceding the point where the reading operation was interrupted.

In step S127 it is subsequently checked whether all packets of the desired information have been read in their entirety. If negative, it is determined, during the execution of step S128, and on the basis of, for example the address information and the synchronization code incorporated in the signal which has been read whether the point where the reading operation was interrupted is reached again. As soon as this point has been reached, the loading of the output buffer 111 is resumed in step S129 by activating the clock signal c14. After the execution of step S129, step S131 is performed again. If it is ascertained in step S131 that the end of the track portion has not yet been reached, step S123 is carried out again. During read-out of the series of steps S123, S124 and S125 the information which has been read is interrupted again as soon as the filling level of the output buffer 111 exceeds the value Vmax2 again.

This process of each time temporarily interrupting the storage of information which has been read is continued until it is ascertained during the execution of step S127 that all desired information has been read, whereafter step S130 is carried out in which the retrieval of the information from the output buffer 111 is interrupted by deactivating the generation of the clock signals c15 and c16 as soon as the output buffer is empty.

If it has been ascertained during the execution of step S131 that the end of a track portion in which a part, not being the last part, of an information signal is approached, step S132 is carried out.

During the execution of step S132 it is checked whether the position has been reached where the storage of read information in the output buffer 111 must be interrupted, preferably on the basis of the end pattern provided. When this position is reached, step S133 is performed in which, similarly as in step S125, the storage of information in the output buffer 111 is discontinued. Subsequently step S134 is performed, making a jump to a point on the track which is located before the start of the next track portion where the next part of the information piece to be read is recorded. Subsequently the start of the information pattern provided in the searched track portion is detected during the execution of step S135. This is preferably realised on the basis of the start pattern provided at the start of the track portion. In response to a detection of this start pattern, the loading of information in the output buffer 111 is resumed during the execution of step S136.

Subsequently the program is continued with step S123.

It is to be noted that the output buffer will no longer be completely full if step S131 is preceded by step S129. This results from the fact that the loading of output buffer 111 was interrupted when the jump was being made during the execution of step S126. It is important that at the instant when it is ascertained in step S131 that the end of a track portion is reached, the output buffer 111 is still sufficiently filled to be able to supply information from the buffer 111 to the output of the reading device during the period of the jump to the next track portion where the further information of the information piece is recorded. This means that the capacity of the output buffer 111 should be chosen to be sufficiently large.

The required capacity of the output buffer may be reduced as follows. Based on the instantaneous filling level of the output buffer, the address of the instantaneous recording and the end address of the available track portion, the instant can be determined at which the last track jump within the track portion then instantaneously in use will be to be performed in order that the output buffer is substantially entirely filled at the start of a jump to the next (non-contiguous) track portion.

FIGS. 15a and 15b show possible adaptations of the embodiment of FIG. 11 for the case where the digitized information to be recorded undergoes an additional modulation treatment. These Figures only show that part of the system which is modified with respect to the system shown in FIG. 11. In FIG. 15a these modifications relate to a modulation circuit 150 for modulating the information retrieved from the input buffer 106. The modulation circuit 150 is to be switched off or switched on simultaneously with the interruption and resumption, respectively, of loading the input buffer 106. This can be realised in a simple manner, for example, by using a clock-controlled modulator which is controlled synchronously with the load clock signal c13. By way of alternative, FIG. 15a shows a digital data compression circuit 105a which is arranged between the circuit 105 and the input buffer 106.

The modifications in FIG. 15b relate to a demodulation circuit 151 for demodulating the information read before it is applied to the output buffer 111. The demodulation circuit 151 should be switched off or switched on simultaneously with the interruption and resumption, respectively, of loading the output buffer 111. This may be realised in a simple manner, for example, by using a clock-controlled demodulator which is controlled synchronously with the load clock signal. By way of alternative, FIG. 15b shows a digital data decompression circuit 112a which is arranged between the output buffer 111 and the D/A converter 112.

The invention has been described hereinbefore with reference to a recording and reading system for rotating disc-shaped record carriers. However, it is to be noted that the use of the invention is not limited to recording and reading systems of rotating disc-shaped record carriers. In principle, the invention may be used in any recording and reading system in which it is possible to reposition scanning to a different portion of the track. The use of the invention is also not limited to optical or magneto-optical recording and reading systems, but may also be used in magnetic recording and reading systems.

It is further to be noted that the decision criteria based on which the recording and/or reading operations are interrupted and resumed are not limited to the decision criteria described. For example, it is possible to interrupt the recording and/or reading operations after reading or recording information from/on an integral number of turns of the spiral track. It is, for example, also possible to resume the recording and/or reading operation only after a minimum time interval has elapsed. It is always essential that the storage capacity be sufficiently large to compensate for the fluctuations occurring in the quantity of information stored during interruptions.

What is claimed is:

1. A record carrier comprising a recording track having information patterns recorded therein representing a plurality of pieces of time-sychronous continuous information; characterized in that: at least one track portion has an information pattern recorded therein for a first complete information piece; said one track portion is located between and adjoining track portions in the track direction which have information patterns recorded therein for different segments of another information piece, each segment is of a length determined by the length of the track portion in which it is recorded; and control information is recorded in the recording track indicative of the locations of each of said adjoining track portions.

2. An information recording device having an input for receiving a continuous time-synchronous information piece to be recorded, said recording device being adapted to record successive segments of said information piece on successive released portions of one or more tracks on a record carrier, the released track portions being intermediate between track portions on which other information pieces have already been recorded and which are to be retained; said recording device comprising:

scanning means including a read/write (R/W) head for scanning the record carrier tracks, the R/W head having a read mode in which it produces read signals representing information which has been recorded on a track being scanned, and a write mode in which it records write signals supplied thereto on a track being scanned;

a write control circuit coupled to R/W head for selectively placing it in either of the read and write modes, and for supplying the R/W head with write signals corresponding to information to be recorded which is supplied to the write control circuit;

an input buffer memory coupled to the input of said recording device to receive and temporarily store successive time-synchronous portions of an information piece received at said input, and having an output coupled to said write control circuit to supply thereto the stored portions of said information piece; and control means coupled to said R/W head for receiving read signals therefrom, said control means being adapted to identify from said read signals track portions which are released for recording, said control means also being coupled to said write control circuit to control whether said R/W head is placed in said read mode or in said write mode, said control means also being coupled to said buffer memory to control whether information stored therein is supplied to said write control circuit; said control means being programmed to:

(i) detect from said read signals when a position proximate the end of a released track portion is reached during recording of write signals on said released track portion;

(ii) in response to detection of said proximate position, interrupt the supply of stored information from said buffer memory to said write control circuit and thereby interrupt the recording of write signals on said released track portions;

(iii) following said interruption of recording, detect from said read signals when a further released track portion has been reached during scanning of said tracks;

(iv) upon detecting said further released track portion, control said buffer memory to resume the supply of stored information therefrom to said write control circuit and thereby resume the recording of write signals on said further released track portion; and (iv) store information identifying the released track portions in which segments of said information piece have been recorded;

said buffer memory having a storage capacity sufficient to store any portion of said information piece which is received during a recording interruption interval.

3. A recording device as claimed in claim 2, wherein said control means is further adapted to adjust the rate of supply of stored information from the buffer memory to the write control circuit so as to maintain a filling level of said buffer memory between predetermined limits.

4. A recording device as claimed in claim 2, further characterized in that the buffer memory supplies a filling level signal to said control means and when said filling level falls below a predetermined range said control means is adapted to (v) interrupt the supply of stored information from said buffer memory to said write control circuit, (vi) control said scanning means to skip said R/W head from an existing scanning position to a previous scanning position and resume scanning, and (vii) resume the provision of stored information from said buffer memory to said write control circuit when said R/W head again reaches the scanning position where it had been skipped; whereby the filling level of the input buffer is maintained within said predetermined range.

5. A recording device as claimed in claim 2, further comprising a data compression circuit coupled between the input of said device and said R/W head.

6. A device for reading a record carrier having a recording track recorded with information patterns representing a plurality of pieces of time-synchronous information, each information piece being continuous, the information pattern on at least one portion of the track representing one complete information piece, said one track portion being located between and contiguous with each of two other track portions having thereon information patterns which respectively represent respective segments of a second complete information piece, control information also being recorded on the record carrier indicative of the positions of said two other track portions; said device comprising:

scanning means including a read head for scanning the recording track and producing read signals therefrom corresponding to the information patterns and control information recorded thereon;

a signal processing circuit coupled to said read head for receiving read signals therefrom and producing information signals and control signals corresponding to the read signals;

an output buffer memory coupled to said signal processing circuit for receiving and temporarily storing the information signals produced thereby and thereafter supplying the stored information signals at an output of said device; and control means coupled to said signal processing circuit for receiving the control signals produced thereby and which in response to said control signals is programmed to (i) interrupt the supply of information signals to the buffer memory when the read head reaches the end of a first of said two other track portions, (ii) control said scanning means to displace the read head to the beginning of a second of said two other track portions, and (iii) resume the supply of information signals to the buffer memory when the read head reaches the beginning of said second track portion;

the buffer memory having sufficient capacity so that the information signals produced at the output thereof derived from read signals produced from said two other track portions form a continuous representation of said second complete information piece.

7. A read device as claimed in claim 6, wherein the buffer memory is adapted to supply a signal indicative of a filling level thereof to said control means and said control means is further programmed to:

(iii) control the scanning means so that read signals are produced by the read head at a rate which exceeds the rate at which information signals are supplied from the buffer memory to the output of said device;

(iv) when the buffer memory reaches a maximum filling level, interrupt the supply of read signals from the read head to the signal processing circuit and control the scanning means to return the read head back to a previous scanning position on the track; and (v) resume the supply of read signals from the read head to the signal processing circuit when the read head again reaches the scanning position at which the supply of read signals therefrom had been interrupted;

whereby the filling level of the buffer memory is maintained within predetermined limits.

8. A read device as claimed in claim 7, further comprising a data decompression circuit between the buffer memory and the output of said device.

* * * * *